United States Patent [19]
Godet et al.

[11] 4,136,229
[45] Jan. 23, 1979

[54] SECURITY PAPER

[75] Inventors: Jean-Yves Godet; Giampaolo Bartoli, both of Charavines, France

[73] Assignee: Societe Anonyme dite: Arjomari-Prioux, Paris, France

[21] Appl. No.: 845,112

[22] Filed: Oct. 25, 1977

[51] Int. Cl.² .................. D21H 5/10; B41M 3/14; B44F 1/12
[52] U.S. Cl. ................................ 428/537; 8/1 B; 8/54.2; 106/148; 162/140; 427/7; 427/157; 427/158; 428/411; 428/913; 428/916
[58] Field of Search .................... 427/7, 157, 158; 106/148; 8/1 B, 54.2; 428/913, 916, 537, 411; 162/140

[56] References Cited

U.S. PATENT DOCUMENTS

| 2,445,586 | 7/1948 | Simons | 428/913 X |
| 3,088,949 | 5/1963 | Moser et al. | 106/148 X |
| 3,767,516 | 10/1973 | Brady | 428/913 X |
| 3,804,774 | 4/1974 | Betts et al. | 427/157 X |
| 3,886,083 | 5/1975 | Laxer | 428/916 X |
| 3,928,226 | 12/1975 | McDonough et al. | 428/916 X |
| 4,037,007 | 7/1977 | Wood | 427/7 X |

Primary Examiner—Harold Ansher
Attorney, Agent, or Firm—Bacon & Thomas

[57] ABSTRACT

Security paper which immediately reveals an attempt to alter handwriting thereon by the use of an alkaline ink remover and which is characterized by the incorporation therein of a pyrenesulphonic acid or a metal salt thereof, particularly an alkali metal or alkaline earth metal salt.

Security paper incorporating such an acid or salt exhibits a fluorescent coloration when contacted with an alkaline ink remover.

5 Claims, No Drawings

SECURITY PAPER

The present invention is concerned with security paper.

Various means have been previously proposed for solving the problem of detecting the alteration or forging by the use of bleaching agents of the handwriting and stamps carried on, or applied to, hand written payment documents or official documents, such as cheques, paper money, savings books, cash vouchers, ledgers, title deeds and notarised documents. However, these solutions suffer from numerous disadvantages.

Thus, the use of coloured acid-base indicators such as the phthaleins and sulphone-phthaleins of U.S. Pat. No. 2,445,586 and of German Pat. No. 856,842 entails the use of complicated papermaking techniques. Such pH indicators are insoluble or virtually insoluble in water or in the common aqueous compositions used for the surface treatment of paper. They must therefore be solubilised by means of organic solvents and this, when they are applied to paper, entails ignition and explosion hazards and various nuisances, as well as a reduction in the efficiency of the sizing agent for the paper and/or it is necessary to disperse them by means of surface active agents, which entails the disadvantage of interfering with the sizing of the sheet to which the dispersion containing the indicators is applied.

It is also known to incorporate reactants which develop of fluorescence, in particular eosin, rhodamine and the flavins such as thioflavin, in safety papers, see French Pat. No. 806,805 and Belgian Pat. 523,251. The use of these reactants also required resorting to special techniques (coating and printing, especially for the purpose of applying a composition containing one of these reactants).

We have now found that certain fluorescent dyestuffs do not suffer from the disadvantages of the prior art and, on the contrary, offer numerous advantages, because of their high solubility in water over a wide range of pH, their compatibility with the solutions and dispersion of conventional paper surface-treatment agents used in simple sizing or impregnating presses on a paper machine, their lack of an adverse effect on sizing, and their ability to show immediately, under the action of ink removers and slightly alkaline agents, a coloration which is fluorescent in daylight and is persistent.

According to the present invention, therefore, we provide a security paper having therein or thereon at least one fluorescent dyestuff which is a pyrenesulphonic acid or metal salt thereof, preferably an alkali metal or alkaline earth metal salt thereof.

Pyrene is an aromatic compound with fused rings, of the formula:

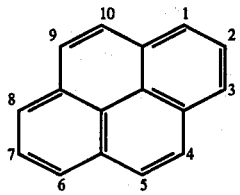

The pyrenesulphonic acids which can be used (preferably in the form of their metal salts) in the present invention are preferably the acids containing:

One, two, three or four sulphonic acid groups located in the 3-, 5-, 8- and/or 10 - positions, optionally, and preferably, at least one electron donor group, such as OH and $NR_1R_2$, where $R_1$ and $R_2$, which may be the same or different, are each H or a $C_1$-$C_4$ alkyl group, the electron donor group being present as a substituent in the 3-, 5-, 8- or 10 - position, and optionally, at least one $C_1$-$C_4$ alkyl substituent which can be located on any of the substitutable carbon atoms of the pyrene ring system which is not already occupied by $SO_2H$ or an electron donor group.

The fluorescent dyestuffs which are used according to the invention are known and can be prepared in accordance with known processes, for example by sulphonation of pyrene, aminopyrene or hydroxypyrene; they exhibit a fluorescence of a red, yellow, green or blue colour, depending on the dyestuff, and show good compatibility with papers.

The Table below gives a non-limitative list of the dyestuffs which can be used according to the invention. Amongst these dyestuffs, the preferred member is the sodium salt of 3-hydroxypyrene-5,8,10-trisulphonic acid; this product is sold commercially under the name "Pyranin" and exhibits a green-yellow fluorescence.

In general terms, the preferred dyestuffs for use according to the invention are those of the formula:

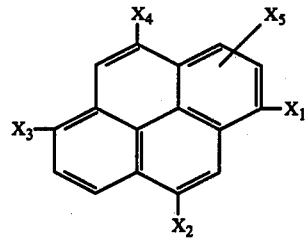

in which $X_1$, $X_2$, $X_3$ and $X_4$, which may be the same or different, are each H, $SO_3H$ or an electron donor group, preferably OH or $NR_1R_2$ group (where $R_1$ and $R_2$ are as defined above), provided that at least one of $X_1$, $X_2$, $X_3$ and $X_4$ is an $SO_3H$ group, and $X_5$ is H or a $C_1$-$C_4$ alkyl group substituted on a substitutable carbon atom of the pyrene ring system not occupied by $SO_3H$ or an electron donor group, and their alkali metal and alkaline earth metal salts.

In order to prepare the security paper according to the invention, the paper is impregnated or coated with an aqueous composition containing the pyrenesulphonic dyestuff; it is particularly preferred that the dyestuff remains near the surface of the paper and that the latter contains from 0.02 to 1 g of dyestuff per square meter. When the amount of dyestuff is less than about 0.02 g per square meter, the action of an alkaline removing agent only produces a very low intensity fluorescence which is difficult to detect; when the amount of dyestuff is greater than 1 g per square meter, the dyestuff produces a coloration of the paper and it is impossible to obtain a sufficiently white paper, and the cost price of the paper is increased prohibitively, without any concommitant advantage.

Since the dyestuff is used in particular to detect the action of alkaline products or ink removers containing alkaline products on the paper, it is desirable to ensure that the pH remains slightly acid in the course of introducing the dyestuff into or on to the surface of the paper; in particular, when the dyestuff "Pyranin" is used, it is advisable that the surface pH (on the paper) should be less than 5.5.

Pyrenesulphonic acids and their metal salts, particularly the sodium and potassium salts, exhibit numerous advantages over the prior art, particularly the advantages indicated below for the case of 3-hydroxyprene-5,8,10-trisulphonic acid and it alkali metal salts:

(1) The high solubility in water allows them to be used in a simple papermaking technique without it being necessary to resort to complicated techniques and equipment; furthermore, 3-hydroxypyrene-5,8,10-trisulphonic acid and its sodium or potassium salt are extremely soluble over a wide range of pH and are compatible with the solutions or dispersions of the agents conventionally used in paper surface treatment techniques.

(2) Aqueous surface treatment compositions containing 3-hydroxypyrene-5,8,10-trisulphonic acid and its salts can be applied, without subsequent deterioration of the sizing, to papers which have already been subjected to neutral, acid or basic sizing treatments.

(3) 3-Hydroxypyrene-5,8,10-trisulphonic acid and its alkali metal salts, when applied to the paper in a slightly acid impregnation solution, result in a perfectly white sheet (more than 85% whiteness Photovolt) being obtained if the sheet has a surface treatment pH less than 5.3; in contrast, bromothymol blue, according to German Pat. No. 856,842, gives a yellow-coloured paper at the same pH value.

(4) Paper sensitised by means of 3-hydroxypyrene-5,8,10-trisulphonic acid and its alkali metal salts instantly shows, when exposed to aqueous, inorganic or organic, alkaline reactants, and in particular when in contact with the point of alkaline blue ink remover pencils, an intense green-yellow coloration which is fluorescent in daylight and in conventional lighting; such paper enables the behaviour of the preferred dyestuff used according to the invention to be distinguished from that of the previously proposed reactants which are either initially coloured and fluorescent in natural light, before having undergone a chemical change by means of an ink remover, as is the case with eosin, rhodamine and flavins, or are initially colourless in natural light, as is the case with optical whiteners, but with which attempts at chemical alteration of the writing are only detectable under light from a Wood lamp.

(5) Finally, the fluorescent coloured stain obtained with 3-hydroxypyrene-5,8,10-trisulphonic acid and its alkali metal salts is fixed to the cellulose of the paper and only disappears on prolonged washing; in contrast, the magenta coloration given by phenolphthalein in contact with an alkaline ink remover is reversibly removable in contact with a mere drop of water at a neutral pH. Consequently, in order to remove the fluorescent coloured stain obtained according to the invention, prolonged washing must be carried out, which would destroy the cellulosic support and thus interfere with the forging.

In order that the invention may be more fully understood, the following examples are given by way of illustration only:

EXAMPLE 1

Use of sodium 3-hydroxypyrene-5,8,10-trisulphonate

A paper was impregnated by means of a sizing bath having the following composition, by weight:

| | |
|---|---|
| Oxidised starch | 7 to 12 parts |
| Sodium salt of 3-hydroxypyrene-5,8,10-trisulphonic acid | 0.3 part |
| Water . . . amount required for | 100 parts |
| Hydrochloric acid required to give a pH of 5, so as to deposit about 0.1 g of dyestuff per m². | |

A white paper was obtained which was very sensitive to ink remover pencils and to various alkaline products, which spontaneously develop a vivid green-yellow coloration.

EXAMPLE 2

Use of sodium pyrene-3,5-disulphonate

The procedure of Example 1 was repeated but replacing the sodium 3-hydroxypyrene-5,8,10-trisulphonate by sodium pyrene-3,5-disulphonate and a white paper which was very sensitive to ink remover pencil was obtained.

EXAMPLES 3 to 6

The procedure of Example 1 was repeated, but replacing the sodium 3-hydroxypyrene-5,8,10-trisulphonate by the following dyestuffs: potassium pyrene-3,8-disulphonate, sodium pyrene-3,5,8-trisulphonate and sodium 3-amino-pyrene-5,8,10-trisulphonate. White papers were obtained in each case which were very sensitive to ink remover pencils and which spontaneously developed a coloration which was visible and fluorescent in natural light.

A summary of the fluorescent colourations obtained with various pyrene sulphonic acid salts is given in the following Table:

| PYRENESULPHONIC ACIDS | | | | | FLUORESCENCE OF THE SALTS IN A NEUTRAL OR ALKALINE POLAR MEDIUM |
|---|---|---|---|---|---|
| NATURE AND POSITION OF THE SUBSTITUENTS | | | | | |
| $C_2$ | $C_3$ | $C_5$ | $C_8$ | $C_{10}$ | |
| H | OH | $SO_3H$ | $SO_3H$ | $SO_3H$ | GREEN |
| H | $SO_3H$ | $SO_3H$ | $SO_3H$ | OH | GREEN |
| H | $SO_3H$ | $SO_3H$ | H | H | PALE BLUE |
| H | $SO_3H$ | H | $SO_3H$ | H | VIOLET BLUE |
| H | $SO_3H$ | OH | H | H | GREEN BLUE |
| H | OH | OH | $SO_3H$ | $SO_3H$ | GREEN |
| H | $NH_2$ | $SO_3H$ | $SO_3H$ | $SO_3H$ | GREEN |
| H | $NHCH_3$ | $SO_3H$ | $SO_3H$ | $SO_3H$ | GREEN |
| H | $SO_3H$ | $SO_3H$ | $SO_3H$ | H | VIOLET |
| H | $SO_3H$ | $SO_3H$ | $SO_3H$ | $SO_3H$ | VIOLET BLUE |
| $CH_3$ | $SO_3H$ | $SO_3H$ | $SO_3H$ | $SO_3H$ | GREEN |

What is claimed is:

1. Security paper having incorporated therein from 0.02 to 1 g per square meter of at least one fluorescent dyestuff selected from the group consisting of a pyrenesulfonic acid and a metal salt thereof, said dyestuff not normally affecting the coloration of said paper but exhibiting a fluorescent coloration visible in daylight and in conventional lighting when said paper is contacted by an alkaline reagent.

2. Security paper as set forth in claim 1, wherein said dyestuff is a salt selected from the group consisting of alkali metal and alkaline earth metal salts.

3. Security paper as set forth in claim 1, wherein said dyestuff is selected from the group consisting of pyrenesulfonic acids of the formula:

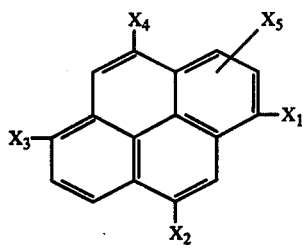

wherein $X_1$, $X_2$, $X_3$ and $X_4$ are individually selected from the group consisting of H, $SO_3H$ and an electron donor group, provided that at least one of $X_1$, $X_2$, $X_3$ and $X_4$ is an $SO_3H$ group, and $X_5$ is selected from the group consisting of H and $C_1$–$C_4$ alkyl groups substituted on any substitutable carbon atom of the pyrene ring system not already occupied by another substituent, and alkali metal and alkaline earth metal salts of said acids.

4. Security paper as set forth in claim 3, wherein said electron donor group is selected from the group consisting of OH and $NR_1R_2$, where $R_1$ and $R_2$ are individually selected from the group consisting of H and $C_1$–$C_4$ alkyl groups.

5. Security paper as set forth in claim 1, wherein said dyestuff is a salt selected from the group consisting of alkali metal and alkaline earth metal salts of 3-hydroxy-pyrene-5,8,10-trisulfonic acid.

* * * * *